US008610537B2

(12) United States Patent
Yamagiwa

(10) Patent No.: US 8,610,537 B2
(45) Date of Patent: Dec. 17, 2013

(54) VEHICLE-USE KEY, MAINTENANCE SUPPORT/MANAGEMENT SYSTEM OF VEHICLE, AND STOLEN VEHICLE CHECK SYSTEM

(75) Inventor: Toshio Yamagiwa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1078 days.

(21) Appl. No.: 12/134,408

(22) Filed: Jun. 6, 2008

(65) Prior Publication Data

US 2008/0303629 A1 Dec. 11, 2008

(30) Foreign Application Priority Data

Jun. 8, 2007 (JP) ................................. 2007-152819

(51) Int. Cl.
*G05B 19/00* (2006.01)
*G05B 23/00* (2006.01)

(52) U.S. Cl.
USPC .......... 340/5.3; 340/5.1; 340/426.1; 307/10.5

(58) Field of Classification Search
USPC ....................................................... 340/5.72
See application file for complete search history.

(56) References Cited

U.S. PATENT DOCUMENTS

| 5,838,251 | A * | 11/1998 | Brinkmeyer et al. | ......... 340/5.22 |
| 6,853,894 | B1 * | 2/2005 | Kolls | ............................... 701/29 |
| 2002/0194476 | A1 * | 12/2002 | Lewis et al. | .................... 713/169 |
| 2003/0191660 | A1 * | 10/2003 | Himes | ............................... 705/1 |
| 2004/0088228 | A1 * | 5/2004 | Mercer et al. | .................... 705/28 |
| 2004/0164140 | A1 * | 8/2004 | Voeller et al. | .................. 235/375 |
| 2005/0012593 | A1 * | 1/2005 | Harrod et al. | ................ 340/5.72 |

FOREIGN PATENT DOCUMENTS

| JP | 5-257941 A | 10/1993 |
| JP | 2005-071105 A | 3/2005 |
| JP | 2005-157533 A | 6/2005 |
| JP | 2006-146576 A | 6/2006 |
| JP | 2006-282091 A | 10/2006 |

* cited by examiner

*Primary Examiner* — Toan N Pham
*Assistant Examiner* — Frederick Ott
(74) *Attorney, Agent, or Firm* — Birch, Stewart, Kolasch & Birch, LLP

(57) ABSTRACT

A vehicle-use key for storing and for acquisition of information on a vehicle. The vehicle-use key permits an individual to use the vehicle, to prevent the key from being taken away when the vehicle is stolen and for finding the stolen vehicle. A vehicle-use key is used for starting a vehicle, and is configured to include a radio communication part (RFID) which performs communication with an external communication device. By providing the radio communication part to the vehicle-use key which an owner of a vehicle carries with him/her, information (data) can be transmitted or received between the radio communication part and the reader/writer of a PC terminal installed in a dealer or the like by radio. Thus, vehicle history data, maintenance history data and the like on a vehicle associated with the vehicle-use key can be transmitted and received and stored when necessary.

12 Claims, 4 Drawing Sheets

VEHICLE-USE KEY, MAINTENANCE SUPPORT/MANAGEMENT SYSTEM OF VEHICLE, AND STOLEN VEHICLE CHECK SYSTEM

CROSS-REFERENCE TO RELATED APPLICATIONS

The present application claims priority under 35 USC 119 to Japanese Patent Application No. 2007-152819 filed on Jun. 8, 2007 the entire contents of which are hereby incorporated by reference.

BACKGROUND OF THE INVENTION

1. Field of the Invention

The present invention relates to a vehicle-use key used for starting a vehicle and including an RIFD for enabling the communication with an external means, and a maintenance support/management system of a vehicle and a stolen-vehicle check system constituted by utilizing the vehicle-use key.

2. Description of Background Art

The RFID (Radio Frequency Identification: also referred to as an IC tag or an electronic tag) is a tag device which can perform the automatic identification by radio, and is an extremely minute tag device. The RFID includes an IC chip and an antenna. The IC chip further includes a radio circuit capable of performing transmission/reception with a memory, a control circuit and a decoding circuit. Recently, an extensive use of the RFID referred to as "IC tag" popularly in Japan has been expected as a minute tag device that functions as an electronic label.

With respect to a related art which applies an RFID (or IC tag) to a system or a device, various systems are known such as disclosed in JP-A-2005-157533 and JP-A-2006-282091. A product repair promotion system disclosed in JP-A-2005-157533 is configured such that an IC tag storing an identifier specifying a type of a product is attached to the product, and an IC tag reader for reading the identifier is installed in a store or the like. When a user visits a store carrying a product with him/her, the reader installed in the store reads the identifier of the product from the IC tag attached to the product, and a server determines the product, and manages the contents of the services to the product and the inventory of components of products, etc. A tire information transmission device disclosed in JP-A-2006-282091 is constituted of an IC tag attached to a back surface portion of a tire and a sensor unit attached to a tire wheel and performs radio communication with the IC tag. The information on the tire stored in the IC tag is transmitted to an ECU mounted on a vehicle body via the sensor unit of the tire wheel and an initiator on a vehicle body side. The tire information transmission device or the like is constituted by utilizing the equipment of a tire air pressure monitoring system which is originally mounted on the vehicle. As a result, it is unnecessary to provide dedicated auxiliary communication equipment as the tire information transmitting device. Thus, a realization in a reduction in the cost and a savings in space is achieved.

Further, there has been also proposed an automobile management system which performs a customer management by using a non-contact IC card instead of an RFID (IC tag). See, for example, JP-A-5-257941. In the automobile management system, an IC card is mounted on the automobile side and an external master unit is arranged outside the automobile. Via the radio communication between an IC card and an external master unit, necessary information is transmitted from the IC card to the external master unit. Accordingly, with such an automobile management system, in using an automobile, a client can perform the showing/collation of his/her driver's license or automobile inspection certification, a periodic check of the automobile, the use of a parking area, and an oil-filling operation, etc. The above-mentioned non-contact IC card is usually carried by a driver and is set in the automobile at the time of using the automobile.

In the system constitutions disclosed in JP-A-2005-157533 and JP-A-2006-282091, the RFID is assembled in the product or the tire. Accordingly, when the product, that is, the tire or the vehicle per se is stolen, the RFID per se is stolen together with the product or the like. As a result, information is lost and the stolen vehicle may not be found. Further, in the device disclosed in JP-A-5-257941 which uses the IC card, the IC card per se does not form a constitutional element associated with the vehicle to inevitably form an integral part of the vehicle. Accordingly, it is necessary for a user to be always be conscious of whether or not the user carries the IC card with him/her.

SUMMARY AND OBJECTS OF THE INVENTION

The embodiment of the present invention provides a vehicle-use key which facilitates the storing and acquisition of information on a vehicle, allows a user to inevitably carry the key with him/her without being conscious of carrying of the key due to the strong association of the vehicle-use key with the vehicle in using the vehicle, surely prevents the key from being taken away when the vehicle is stolen, and is used for finding the stolen vehicle.

Further, it is another object of an embodiment of the present invention to provide a maintenance support/management system for a vehicle built up by making use of the above-mentioned vehicle-use key which facilitates the storing and acquisition of information associated with a corresponding vehicle for efficiently performing maintenance support/management of a vehicle due to the strong association of the vehicle-use key with the vehicle in using the vehicle. A stolen-vehicle check system is provided which can surely prevent the vehicle from being stolen and can easily find the stolen vehicle.

According to an embodiment of the present invention, the first vehicle-use key is a vehicle-use key used for starting a vehicle and includes a radio communication means for performing communication with an external communication means other than the vehicle.

In the above-mentioned vehicle-use key, by providing the radio communication means to the vehicle-use key carried by an owner, the transmission and the reception of information (data) can be performed between the vehicle-use key and a reader/writer of a PC terminal installed to a dealer, etc, by way of electric waves. Thus, vehicle history data, maintenance history data or the like on the vehicle associated with the vehicle-use key can be, when necessary, transmitted, received and stored.

According to an embodiment of the present invention, the second vehicle-use key is, in the above-mentioned constitution, preferably characterized in that the radio communication means includes a specific code (key ID) only associated with the vehicle, and a memory for storing necessary information on the vehicle. By storing the key ID in the memory and by performing the transmission and reception of information with the external administration management system or the like, the key ID and a vehicle number of a vehicle can be easily collated with each other.

According to an embodiment of the present invention, the third vehicle-use key 11 includes an insertion portion 11a inserted into an insertion hole formed in the vehicle 12 and a tab portion 11b mounted on the insertion portion 11a, wherein the radio communication means is mounted on the tab portion 11b. Due to such a constitution, it is possible to provide an information communication function portion (RFID 13) in the vehicle-use key 11 in an efficiently arrangement state, while maintaining a usual function and a shape of the vehicle-use key 11.

According to an embodiment of the present invention, the fourth vehicle-use key 11 includes an information communication function portion (RFID 13) mounted on the vehicle-use key 11 for performing intercommunication between the vehicle-use key and information processing communication means (ECU or the like) mounted on the vehicle 12. It is also possible to provide the information communication function portion (RFID 13) according to the invention in a card-type vehicle-use key, conventionally known as a smart key.

According to an embodiment of the present invention, the fifth vehicle-use key is, in the above-mentioned constitution, characterized in that the radio communication means is an RFID.

According to an embodiment of the present invention, the sixth vehicle-use key is, in the above-mentioned constitution, preferably characterized in that the specific code stored in the memory has the one-to-one correspondence with the vehicle, and the improper use (illegal use) of other key for the vehicle is confirmed based on collation treatment relating to the one-to-one correspondence.

According to an embodiment of the present invention, the maintenance support/management system according to the invention is a maintenance support/management system for performing the maintenance support/management of a vehicle by obtaining data on the vehicle using a radio communication means which performs communication with a communication means outside the vehicle, wherein the radio communication means uses a vehicle-use key used for starting a vehicle and including a radio communication means for performing a communication with an external communication means other than the vehicle. In addition, the communication of a portion of or the whole necessary information on the vehicle-use key is performed between the radio communication means and the external communication means outside the vehicle.

According to an embodiment of the present invention, a stolen-vehicle check system is provided for checking a stolen vehicle by obtaining data of the vehicle using a radio communication means which performs the communication between the radio communication means and a communication means outside the vehicle. The radio communication means uses a vehicle-use key used for starting a vehicle and includes a radio communication means for performing a communication with an external communication means other than the vehicle. The communication of a portion of or the whole of the necessary information on the vehicle-use key is performed between the radio communication means and the external communication means outside the vehicle.

The invention can acquire the following advantageous effects.

The vehicle-use key vehicle-use key includes a radio communication means for performing communication with the external communication means of a terminal device other than the vehicle. The vehicle-use key is unnecessary except for the driving time. Thus, even when the vehicle is stolen during parking, for example, it is possible to prevent the radio communication means for information communication from being taken away.

Further, the radio communication means for information communication is provided to the vehicle-use key used for starting at the time of driving the vehicle. Thus, the key is considered always necessary at the time of using the vehicle whereby it is possible to acquire an advantageous effect that the owner is not required to be particularly conscious of carrying the vehicle-use key with him/her.

Further, the key ID stored in the vehicle-use key equipped with the RFID is only associated with the vehicle number of the specific vehicle. Accordingly, even when the vehicle body is stolen, by collating the key equipped with the RFID with the vehicle body number, the stolen vehicle can be easily found at the time of an illegal resale or export. Further, the maintenance support or the management of the vehicle can be also efficiently performed.

Still further, due to the above-mentioned advantageous effects, even when the vehicle is brought to a dealer for maintenance or the like, for example, there is no possibility that the user forgets to carry the data thus a service to the user is improved.

Further, the maintenance support/management system of an embodiment of the invention which can be built up using the vehicle-use key facilitates the storing and acquisition of information on the corresponding vehicle and is strongly associated with the vehicle at the time of using the vehicle. Thus, the maintenance support/management of the vehicle can be efficiently performed.

Still further, the stolen-vehicle check system of an embodiment of the invention which can be built up using the vehicle-use key also facilitates the storing and acquisition of information on the corresponding vehicle and is strongly associated with the vehicle at the time of using the vehicle. Thus, the stealing of the vehicle can surely be prevented and the stolen vehicle can be easily found.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment (an example) of the invention is explained in conjunction with attached drawings.

Figure 1:
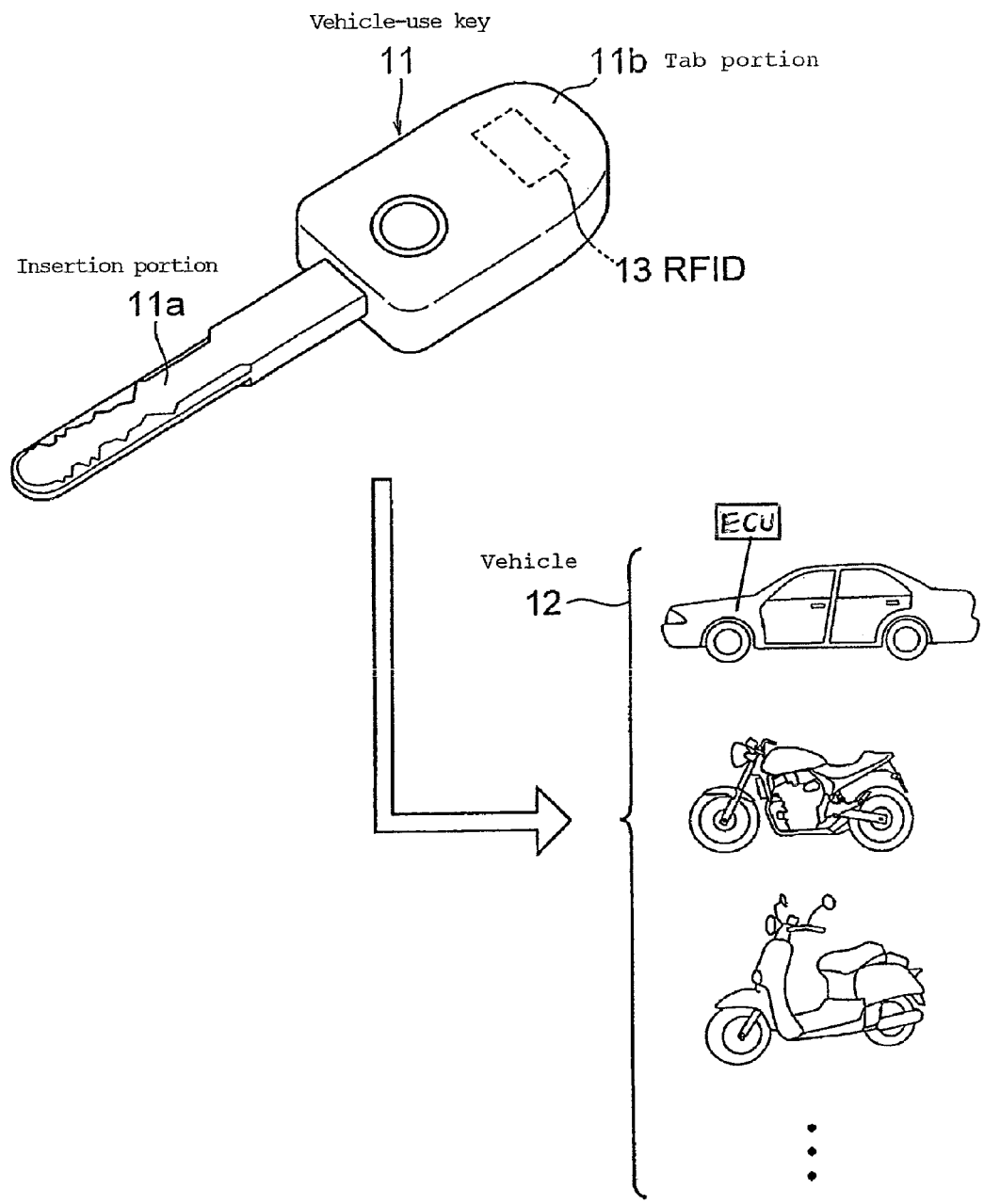
FIG. 1 is a view showing an appearance of a vehicle-use key according to an embodiment of the invention and the relationship between the vehicle-use key and a vehicle corresponding to the key.

FIG. 1 shows an appearance of a vehicle-use key according to the typical embodiment of the invention. The vehicle-use key 11 includes an insertion portion 11a to be inserted into a key insertion hole (key hole) formed in a vehicle 12, and a tab portion 11b mounted on a head portion of the insertion portion 11a. The vehicle-use key 11 is used for one specific vehicle 12 corresponding to the vehicle-use key 11. Here, as an example of the vehicle 12, a four-wheeled vehicle, a motorcycle (including a scooter), a bicycle, or a vehicle similar to the above-mentioned vehicle may be named. In the vehicle 12, when the vehicle-use key 11 is fitted in the vehicle 12 by inserting the vehicle-use key 11 in the key insertion hole of the vehicle 12 to bring the vehicle into an ignition ON state, respective devices such as a drive system including an engine, etc. or an electric control system or the like are generally activated.

With respect to the vehicle-use key 11, the insertion portion 11a has a shape formed by, for example, machining, and the tab portion 11b is made of a resin material. An uneven portion which is engaged with the unevenness of the key hole is formed in a portion of the insertion portion 11a along a longitudinal side of the insertion portion 11a. The tag portion 11b includes a RFID (IC tag or electronic tag) 13. The RFID 13 may be arranged in the inside of the tag portion 11b or may be arranged on a surface of the tag portion 11b or a portion of the tag portion 11b in the vicinity of the surface.

Figure 2:
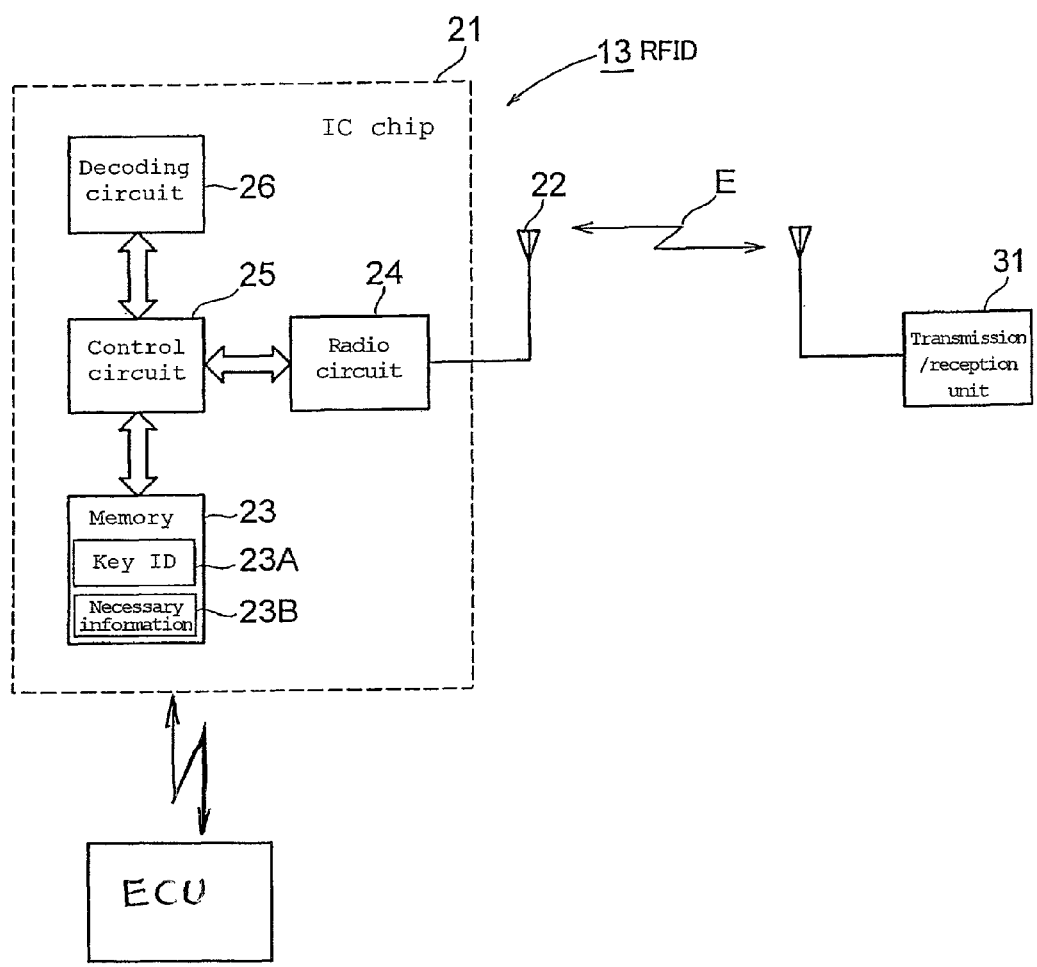
FIG. 2 is a view showing the internal constitution of an RFID which is provided to the vehicle-use key according to the embodiment of the invention.

The RFID 13 includes, as shown in FIG. 2, an IC chip 21 and an antenna 22. Further, the IC chip 21 usually includes a radio circuit 24 which performs the data transmission/reception with a memory 23, a control circuit (arithmetic processing part) 25 and a decode circuit 26. The RFID 13 attached to the vehicle-use key 11 is a radio communication means which can perform the required communication with a transmission/reception unit (reader/writer or the like) 31 arranged outside the RFID 13 by radio (electric waves) E.

In the memory 23 of the RFID 13, a key ID 23A and various necessary information (data) 23B are stored. The amount of the information 23A is determined corresponding to a capacity of the memory 23 of the RFID 13.

The key ID 23A is associated with a vehicle body number of one specific vehicle 12 corresponding to the vehicle-use key 11 provided with the RFID 13. The key ID 23A stored in the memory 23 of the RFID 13 is a specific code which associates the vehicle-use key 11 and one specific vehicle 12. A date on the key ID 23A of the memory 23 is stored in the memory 23 simultaneously with the completion of the manufacture of the vehicle 12. The vehicle-use key 11 provided with the RFID corresponding to the vehicle 12.

Further, various necessary information (data) 23B is constituted of information on an owner, information on the vehicle 12, a visit record of the vehicle 12 to a dealer, etc. corresponding to the vehicle 12, a repair history and a maintenance management record of the vehicle 12 at a maintenance factory, an event participation record and the like, for example. The transmission and reception of this necessary information (data) are intercommunicably performed between the RFID 13 and the transmission/reception unit 31 arranged outside the RFID 13 by radio. The above-mentioned transmitting-and-receiving unit 31 is, for example, installed in the dealer (vehicle dealer or the like), the maintenance factory, an event venue and the like respectively.

Further, when using the vehicle-use key 11, for example, in this embodiment, using the insertion portion 11a inserted into the vehicle 12, it is possible to read conditions of the vehicle 12 upon using (mileage, necessity of parts exchange or maintenance time, for example) through the intercommunication between the RFID 13 of the vehicle-use key 11 and the information processing communication means ECU mounted on the vehicle 12. Further, the information which changes depending on a driving state of the vehicle 12 is also stored in the memory 23 of the RFID 13. Here, some of the information stored in the RFID 13 of the vehicle-use key 11 may be stored in the memory of an information processing unit mounted on the vehicle 12. The information may be read by reading data using electric signals by way of the insertion portion 11a, or by reading data between the vehicle 12 and the vehicle-use key 11 using radio, infrared rays or the like.

Next, the explanation is made with respect to an example of a system which uses the vehicle-use key 11 of the vehicle 12 (a motorcycle (scooter) being used as an example) provided with the vehicle-use key 11 having the above-mentioned RFID.

Figure 3:
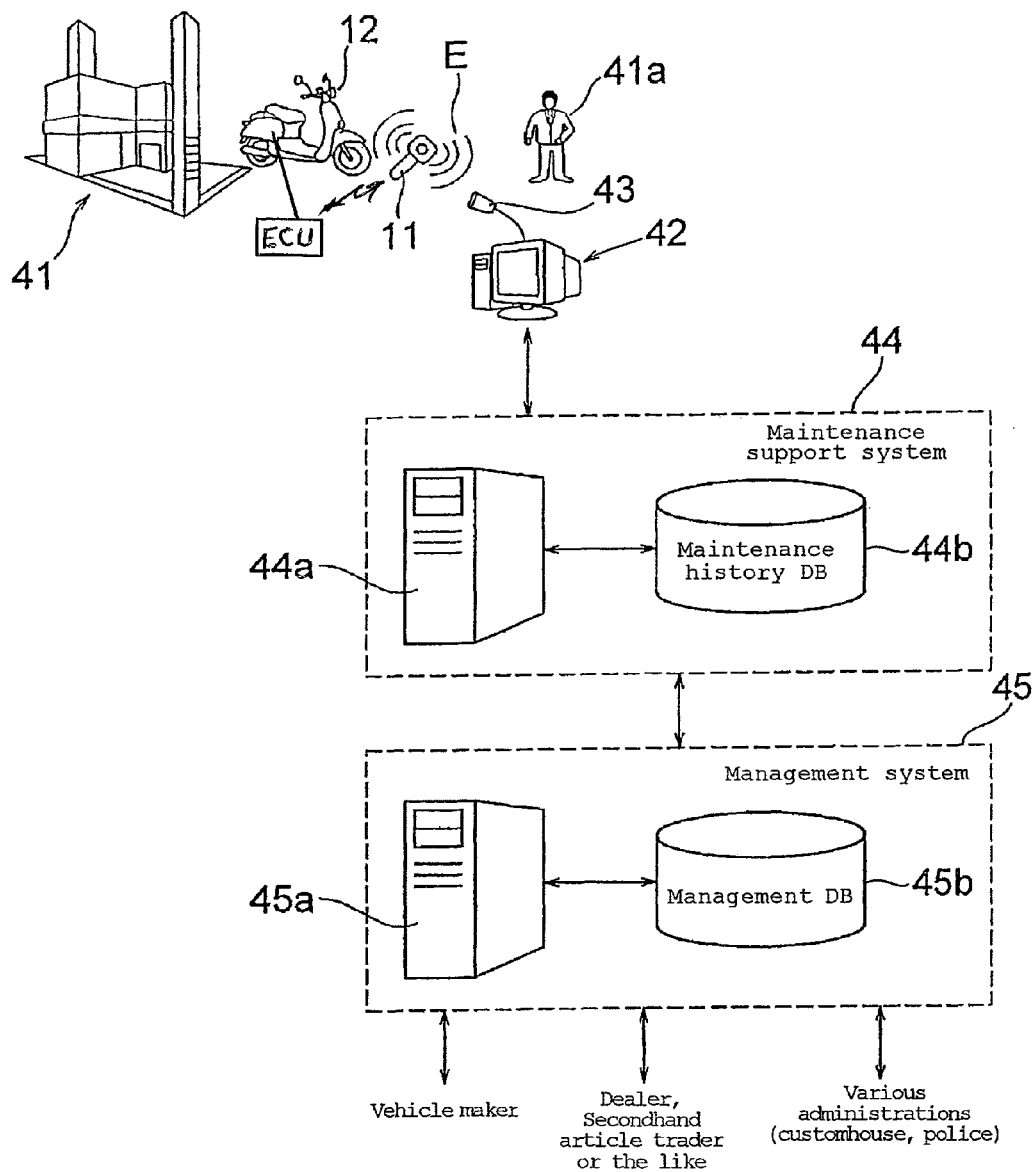
FIG. 3 is a constitutional view showing a first example of a system which uses the vehicle-use key according to the embodiment of the invention.

FIG. 3 shows an example of a first system. When a user carries the vehicle 12 provided with the vehicle-use key 11 having the above-mentioned RFID into a dealer 41, an attendant 41a of the dealer in charge of the vehicle 12 keeps the vehicle-use key 11 and the key ID 23A of the vehicle-use key 11 is read by a reader writer 43 of a PC terminal 42. The PC terminal 42 is connected to a maintenance support system 44. The maintenance support system 44 is constituted of a maintenance-use server 44a and a maintenance history database (maintenance history DB) 44b. The PC terminal 42 identifies a vehicle body number of the vehicle 12 associated with the key 11 based on the key ID 23A stored in the memory 23 incorporated in the RFID 13 by collation. With the use of the vehicle-use key 11 having the RFID, a standardized identification method of a vehicle is established. Further, based on data 23B stored in the memory 23 in the RFID 13 and the maintenance history data obtained by the maintenance history database 44b associated with the vehicle body number, it is possible to obtain a past visit record data of the vehicle, a past periodic check record data of the vehicle, and past data of contents of the repairing and the maintenance of the vehicle.

Here, the above-mentioned maintenance support system 44 is connected to a management system 45 which includes a management server 45a for managing the vehicle and a management database (management DB) 45b. The management system 45 is a system which precedes the maintenance support system 44. With respect to the management system 45, for example, a specific vehicle maker, a dealer and a second-hand article trader, etc. relating to the vehicle maker, and various administrations (customhouse, police) which perform the registration and the management of the vehicle synthetically manage and utilize data relating to the vehicle. Accordingly, in the management database 45b of the management system 45, data on the manufacture, data on parts, data on an owner of the vehicle (customer data), selling history data, reselling history data, data on an accident vehicle or an accident history, data on a stolen vehicle or a stolen history, data on export history and the like are stored.

According to the example of the first system shown in FIG. 3, by making use of the vehicle-use key 11 having the RFID 13 and by constituting the maintenance support system 44 and the management system 45, the maintenance management of the vehicle 12 and the customer management can be easily performed. Further, by unifying the management of information relating to the vehicle 12, the large number of dealers, marketing sections, service sections, maintenance factories and the like can respectively share the information in common.

More particularly, by attaching the RFID 13 to the vehicle-use key 11 which is inevitably necessary for using the vehicle 12 and by providing minimum information to the vehicle-use key 11 which has an extremely strong connection with the vehicle 12 in use, the user can carry the vehicle-use key 11 with him/her without making the user conscious of carrying of the key.

Figure 4:
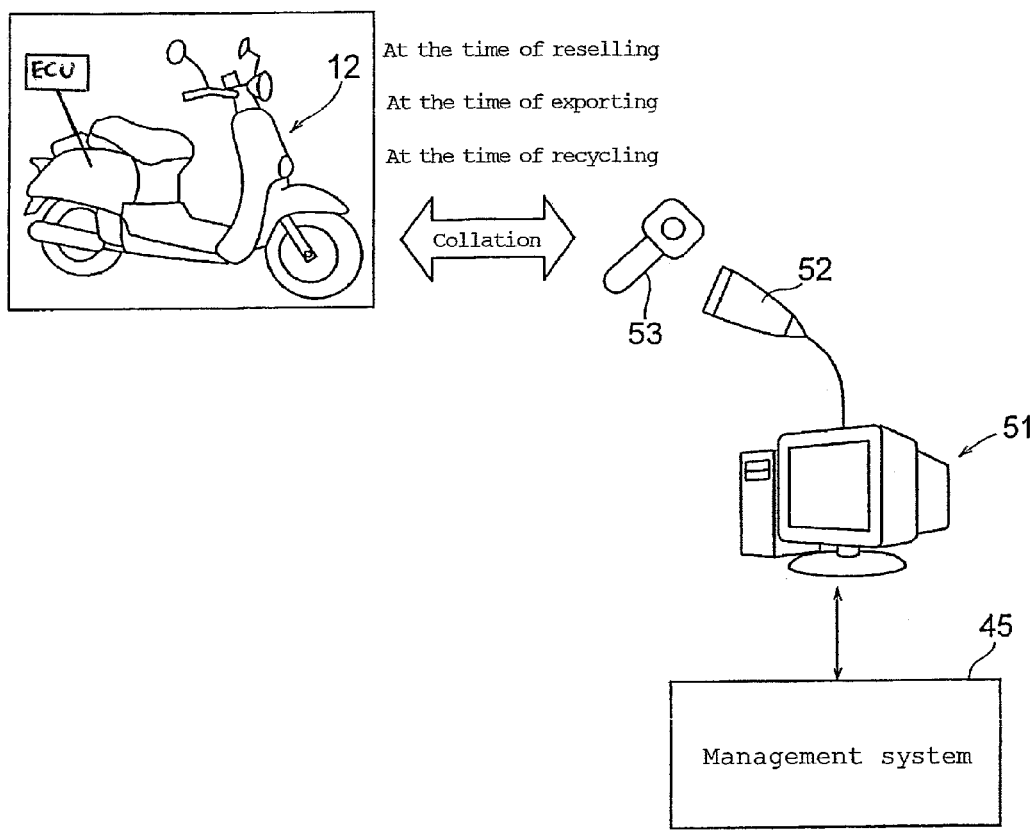
FIG. 4 is a constitutional view showing a second example of a system which uses the vehicle-use key according to the embodiment of the invention.

Next, an explanation is made with respect to an example of a second system in conjunction with FIG. 4. The example of this system deals with the collation which is performed between the vehicle-use key 11 and the vehicle 12 when the vehicle 12 is resold, exported or recycled (scrapped). The second system is required to determine whether or not the vehicle 12 is a vehicle which is legally transacted by the shops, or agencies/organizations, that is, whether or not the vehicle 12 is a stolen vehicle. In this case, the key ID stored in the memory of the RFID in the inside of a vehicle-use key 53 provided to the vehicle 12 is read by a reader/writer 52 of a PC terminal 51 which is installed in the respective shops and agency/organization offices. The key ID is collated with a vehicle body number stored in the management database 45b of the above-mentioned management system 45.

In the explanation made heretofore, when the vehicle-use key 53 provided for the vehicle 12 does not have the structure of the vehicle-use key 11 described above, the vehicle-use key 53 does not include data of the key ID originally. Thus, the reader writer 52 can not read the key ID per se whereby it is possible to easily determine that the vehicle is a stolen vehicle. Further, even when the vehicle-use key 53 includes a structure substantially equal to the structure of the vehicle-use key 11 described above, provided that the key ID stored in the memory of the RFID of the vehicle-use key 53 does not agree with the vehicle body number corresponding to the key ID 23A described above, it is possible to clearly determine that the vehicle 12 is a stolen vehicle. In this manner, by collating the key ID which the vehicle-use key 53 includes with the vehicle body number when the vehicle 12 is resold, exported or recycled (scraped), it is possible to determine whether the vehicle 12 is a vehicle in a legal state or whether the vehicle 12 is a vehicle in an illegal state. Accordingly, even when a person steals only the vehicle body and prepares a vehicle-use key suitable for using the vehicle, with the use of the second system, this system can surely find in advance that the vehicle is a stolen vehicle thus preventing the reselling, an export or the like of the vehicle.

Further, when the vehicle is legally resold, exported or recycled (scrapped), the vehicle history data and vehicle repair data can be confirmed based on the management database 45b of the above-mentioned management system 45 and the maintenance history database 44b of the above-mentioned maintenance support system 44. Further, in the recycling of the vehicle, the certification of R mark can be easily performed.

Further, when a police man conducts a check of a stolen-vehicle such as a motorcycle or the like placed on a road, with the use of the vehicle-use key provided with RFID, the police man can easily conduct the checking of the stolen vehicle using the portable reader writer.

According to the explanation of the above-mentioned embodiment, the explanation has been made with respect to the example of the vehicle-use key 11 which includes the insertion portion 11a and the tag portion 11b. However, the vehicle-use key 11 according to the invention may be in the form of an IC-card-type vehicle-use key (a so-called smart key). Such a vehicle-use key 11 incorporates an IC chip 21 having an information communication function portion (RFID 13) for performing the communication of information with an ECU usually mounted on a vehicle 12 and an information communication means therein. The RFID 13 having the above-mentioned constitution is mounted on the IC-card-type vehicle-use key 11.

In the above-mentioned embodiment, the constitution, the shape and the arrangement relationship of the invention are merely exemplified to an extent that those who are skilled in the art can understand and exercise the invention. Accordingly, the invention is not limited to the explained embodiment, and various modifications are conceivable without departing from the technical concept described in claims of the invention.

The invention is applicable to the vehicle-body maintenance management and the owner management of a vehicle such as an automobile and a motorcycle. Further, the invention is also applicable to the reliable prevention and suppression of illegal reselling or the like in reselling or exporting of the vehicle or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A maintenance support/management system for performing maintenance support/management of a vehicle by obtaining data on the vehicle comprising:
   a radio communication means of a vehicle-use key used for starting the vehicle, and also for performing communication with an external communication means outside the vehicle;
   wherein the external communication means other than the vehicle includes a communication unit of a designated entity outside of the vehicle, and
   the radio communication means of the vehicle-use key is capable of sending and receiving a specific code identifying the vehicle and at least a portion of other data stored in a memory of the vehicle-use key to and from each of the vehicle and the communication unit of the designated entity outside of the vehicle,
   wherein the at least a portion of the other data stored in the memory of the vehicle-use key and sent to the communication unit of the designated entity outside of the vehicle includes:
      vehicle status information including information on vehicle mileage and information on a necessity of parts exchange downloaded from information processing communication means mounted on the vehicle, and
      a repair history of the vehicle performed by the designated entity,
   wherein the specific code stored in the memory has a one-to-one correspondence with the specific code and the vehicle repair history from the information processing communication means of the vehicle, and
   improper use of another vehicle-use key for the vehicle is confirmed based on a collation treatment relating to the one-to-one correspondence of the specific code and the vehicle repair history.

2. The maintenance support/management system according to claim 1, wherein the vehicle-use key includes an insertion portion inserted into an insertion hole formed in the vehicle and a tab portion mounted on the insertion portion, and the radio communication means is mounted on the tab portion.

3. The maintenance support/management system according to claim 1, wherein the vehicle-use key includes an information communication function portion for performing intercommunication between the vehicle-use key and the information processing communication means mounted on the vehicle.

4. The maintenance support/management system according to claim 1, wherein the radio communication means is an RFID.

5. The maintenance support/management system according to claim 1, wherein the specific code stored in the memory has a one-to-one correspondence with the vehicle, and the improper use of another vehicle-use key for the vehicle is confirmed based on a collation treatment relating to the one-to-one correspondence.

6. The maintenance support/management system according to claim 1, wherein the information from the information processing communication means includes a vehicle body number.

7. The maintenance support/management system according to claim 1, further comprising:
 a management database external to the vehicle containing data on a manufacturer of the vehicle, data on an owner of the vehicle, data on selling history of the vehicle, data on reselling history of the vehicle, and data on accident history of the vehicle, and
 a maintenance history database external to the vehicle containing past visit record data of the vehicle, past periodic check record data of the vehicle, and the repair history of the vehicle, which are used in a collation treatment.

8. A stolen-vehicle check system for checking a stolen vehicle by obtaining data of the vehicle comprising:
 a radio communication means of a vehicle-use key used for starting the vehicle and also for performing communication between the vehicle-use key and an external communication means outside the vehicle;
 wherein the external communication means other than the vehicle includes a communication unit of a designated entity outside of the vehicle, and
 the radio communication means of the vehicle-use key is capable of sending and receiving a specific code identifying the vehicle and at least a portion of other data stored in a memory of the vehicle-use key to and from each of the vehicle and the communication unit of the designated entity outside of the vehicle,
 wherein the at least a portion of the other data stored in the memory of the vehicle-use key and sent to the communication unit of the designated entity outside of the vehicle includes:
 vehicle status information including information on a necessity of parts exchange downloaded from information processing communication means mounted on the vehicle, and
 vehicle repair history from information processing communication means of the vehicle,
 wherein the specific code stored in the memory has a one-to-one correspondence with the specific code and the vehicle repair history from the information processing communication means of the vehicle, and
 improper use of another vehicle-use key for the vehicle is confirmed based on a collation treatment relating to the one-to-one correspondence of the specific code and the vehicle repair history.

9. The stolen-vehicle check system according to claim 8, wherein the vehicle-use key includes an insertion portion inserted into an insertion hole formed in the vehicle and a tab portion mounted on the insertion portion, and the radio communication means is mounted on the tab portion.

10. The stolen-vehicle check system according to claim 8, wherein the vehicle-use key includes an information communication function portion for performing intercommunication between the vehicle-use key and the information processing communication means mounted on the vehicle.

11. The stolen-vehicle check system according to claim 8, wherein the radio communication means is an RFID.

12. The stolen-vehicle check system according to claim 8, further comprising:
 a management database external to the vehicle containing data on a manufacturer of the vehicle, data on an owner of the vehicle, data on selling history of the vehicle, data on reselling history of the vehicle, and data on accident history of the vehicle.

* * * * *